United States Patent [19]

Ohbayashi et al.

[11] Patent Number: 4,556,604
[45] Date of Patent: Dec. 3, 1985

[54] MAGNETIC RECORDING MEDIA

[75] Inventors: Nobuo Ohbayashi; Akiho Kawata; Shuichi Miya; Teruhisa Niinuma, all of Gunma, Japan

[73] Assignee: Kanto Denka Kogyo Co., Ltd., Tokyo, Japan

[21] Appl. No.: 647,669

[22] Filed: Sep. 6, 1984

[30] Foreign Application Priority Data

Sep. 28, 1983 [JP] Japan .................. 58-179932

[51] Int. Cl.$^4$ .............................. G11B 5/70
[52] U.S. Cl. .................. 428/323; 252/62.54; 360/134; 360/135; 360/136; 427/128; 427/387; 427/393.5; 427/359; 428/408; 428/694; 428/695; 428/900; 428/447
[58] Field of Search .......... 428/421, 422, 695, 900, 428/694, 408, 447, 323; 427/128, 387, 393.5, 359; 252/62.54; 360/134-136

[56] References Cited

U.S. PATENT DOCUMENTS

| 4,431,703 | 2/1984 | Somezawa | 428/694 |
| 4,450,199 | 5/1984 | Tadokoro | 428/694 |
| 4,452,863 | 6/1984 | Takizawa | 428/695 |

FOREIGN PATENT DOCUMENTS 0156930 12/1981 Japan .................. 428/421

Primary Examiner—Ellis P. Robinson
Attorney, Agent, or Firm—Browdy and Neimark

[57] ABSTRACT

By inclusion of a fluorinated graphite material in conjunction with a silicone oil in the magnetic layer of a magnetic recording medium, the medium is improved significantly in its smooth-running properties and electromagnetic performance properties.

10 Claims, No Drawings

MAGNETIC RECORDING MEDIA

BACKGROUND OF THE INVENTION

This invention relates to magnetic recording media such as magnetic audio and video recording tapes, sheets and disks and, in particular, to magnetic recording media improved in their smooth-running properties and electromagnetic conversion characteristics.

When used in recording and reproducing operations, magnetic recording media, in particular recording tapes, are subjected to sliding contact with parts of recording/reproducing instruments, such as magnetic heads and guide rollers, at a high relative speed. Therefore, it is required that the recording media retain smooth-running properties for a long period of time and have a high level of durability.

Generally, in order to reduce the friction coefficient of the recording media and impart smooth-running properties thereto, certain lubricants have been added to the magnetic layers of media. Silicone oils are typical and well-known as lubricants for these purposes. So far as we know, however, silicone oils have never achieved satisfactory smooth-running properties in the media. In addition, silicone oils show commonly poor compatibility with the resins used as binders in the magnetic layers of media and, hence, tend to exude to the surface of the magnetic layer and to smear the instrument parts which come in contact with the surface.

SUMMARY OF THE INVENTION

We have intensively worked to eliminate or substantially reduce the problems due to the inclusion of a silicone oil lubricant in the magnetic layer of media, and to provide a magnetic recording medium improved in its smooth-running properties. We have now realized that these and other objects can be achieved advantageously by the inclusion of a fluorinated graphite material in conjunction with a silicone oil in the magnetic layer of recording medium.

It has been found that the addition of the fluorinated graphite material together with the silicone oil lubricant improves surprisingly the compatibility between the silicone oil and the binder resin. In addition, since the graphite material exhibits a considerable extent of lubricating properties, when it is used together with the silicone oil lubricant, the friction coefficient of the magnetic layer is synergetically lowered and thus the smooth-running properties of the medium are greatly improved. It is belived that these advantages result from adsorption of the silicone oil onto the graphite material.

DETAILED DESCRIPTION OF THE INVENTION

The present magnetic recording medium will be described in more detail.

The fluorinated graphite material used in the present invention may be represented by the formula $(CF_x)_n$ wherein the value of $x$ is greater than 0.1 but less than 1 (unity).

Preferably, the fluorinated graphite has an average primary particle size of less than about 2 microns, in particular of about 0.01–0.1 microns.

It is preferred that the fluorinated graphite material is prepared by fluorination of a finely divided carbonaceous material, such as carbon black, having an average particle size corresponding to the preferred range for the fluorinated graphite material. If a conventional coarse carbon material which usually has a relatively large average particle size on the order of 10 microns is first fluorinated and then pulverized, the product fluorinated graphite has a unduly broad particle size distribution which necessitates a classification stage to give a fraction of the desired particle size. In addition, such a fluorinated and pulverized graphite material may exhibit an unsatisfactory performance in the magnetic recording media, possibly due to the virgin surfaces which are produced during the pulverization of fluorinated material and are belived to behave differently from the surfaces of the unpulverized material per se.

On the other hand, if it is intended to produce a fluorinated graphite material useful in the present invention by directly treating a finely divided carbonaceous material with a gaseous stream of fluorine diluted with an inert gas such as nitrogen, then the reaction mixture tends to detonate vigorously or to produce a gaseous fluorocarbon mixture containing a major proportion of carbon tetrafluoride in preference to the intended fluorinated graphite product. Thus, such a direct fluorination route is not suitable for the production of the fluorinated graphite useful in the present invention.

We have found that the direct fluorination process can be carried out safely and effectively by dilution of the finely divided carbonaceous material with an amount of previously prepared fluorinated graphite. In a preferred process, thus, a finely pulverized carbonaceous material having an average particle size of about 0.01–0.1 microns is first mixed with a previously prepared fluorinated graphite product in an amount of at least half of the amount of said carbonaceous material (by weight), and then the mixture is brought into contact with a fluorine-containing stream at a temperature of about 200°–500° C. to give the desired product. The thus obtained product may be employed advantageously in the present invention.

Examples of silicone oils which may be used in the invention include various commercially available organopolysiloxanes, such as dimethyl silicone oil and methyl phenyl silicone oil, and modified organosilicons such as amine-modified, polyether-modified and epoxy-modified organosilicons.

Preferred proportions of the silicone oil and of the fluorinated graphite employed in the present recording medium are about 0.1–10 parts by weight of the former and about 2–15 parts by weight of the latter, respectively, per 100 parts by weight of the magentic powder material. Where the silicone oil is used in a proportion exceeding the above preferred range, the oil tends to exude to the surface of the magnetic layer, resulting in smears on the surfaces of the layer and hence on the magnetic head operating in contact therewith. When the amount of fluorinated graphite used is less than the preferred range, it has little or no significant lubrication effect on the magnetic layer. It has been found also that when the fluorinate graphite is used excessively, the binding force of the binder is seriously reduced so that a poor surface condition is imparted to the magnetic layer, which is likely to cause troubles such as "dropout"; and an increased level of noise during use of the recording medium.

The magnefic powder materials used in the present invention may be the conventional ones. Examples of the magnetic materials which may be mentioned include powders of gamma-$Fe_2O_3$, $Fe_3O_4$; gamma-$Fe_2O_3$ doped with one or more doping elements such as Co, Ni and Mn; $Fe_3O_4$ doped with a doping element or elements as above-mentioned; $CrO_2$; and ferromagnetic alloys.

The binders used in the present invention may be the conventional ones, for example vinylchloride/vinylacetate copolymers, polyurethane resins, epoxy resins, cellulosic resins, acrylate/acrylonitrile copolymers, acrylate resins, polyester resins, vinyl acetate resins and rubber-based binders. The binders may be used alone or in admixture of two or more binders.

The substrates or carriers used in the invention may be of the conventional materials including various plastic materials such as polyesters, polyvinylchloride, polystyrene, polyamides, polycarbonates, cellulose ethers and other equivalents.

In the practice of the present invention, the following advantages are achieved:

(1) The compatibility between the silicone oil and the binder resin is significantly enhanced by aid of the fluorinated graphite, whereby the tendency of silicone oil to exude to the surface of the magnetic layer is effectively reduced.

(2) The electromagnetic performance properties of the recording medium are improved.

(3) The friction coefficient of the magnetic layer is reduced sufficiently to enable the medium to travel smoothly and consistently.

(4) The durability of the magnetic layer is so improved that the medium has an increased operable life even under very severe conditions as usually encountered in VTR instruments.

The following Examples are presented to more fully illustrate the present invention.

EXAMPLE 1

|  | Parts by weight |
|---|---|
| Co-containing ferromagnetic iron powder | 100 |
| BTH ½ | 10 |
| (nitrocellulose ex Asahi Chemical Industry Co.) | |
| T-5260S | 15 |
| (polyurethane ex Dainihon Ink Industry Co.) | |
| Coronate L | 5 |
| (polyurethane ex Nippon Polyurethane | |
| Industry Co.) | |
| fluorinated graphite (0.03 microns) | 5 |
| silicone oil TA-830 | 2 |
| (ex Shin-Etsu Kagaku Kogyo Co.) | |
| antistatic agent GAFAC RS-610 | 3 |
| (ex Toho Chemical Industry Co.) | |
| methyl ethyl ketone (MEK) | 100 |
| cyclohexanone | 150 |

The above ingredients were dispersion-mixed together in a sand mill to prepare a magnetic paint composition. Then the composition was passed through a filter of an average aperture size of 1.0 micron and spread over a surface of a polyester film (14 microns thick) in an amount such as to leave a 4 micron dried coat thereon. After drying, the coated polyester film was calendered and then heat-treated at 50° C. for 96 hours. The thus treated film was slite into a video recording tape of an appropriate width.

EXAMPLE 2

|  | Parts by weight |
|---|---|
| ferromagnetic iron-based alloy powder | 100 |
| VAGA | 10 |
| (vinylchloride/vinylacetate copolymer ex UCC) | |
| Nipporan N-2304 | 15 |
| (polyurethane ex Nippon Polyurethane | |
| Industry Co.) | |
| Paraprene 26SM | 5 |
| (polyurethane ex Nippon Polyurethane | |
| Industry Co.) | |
| Coronate L | 8 |
| fluorinated graphite (0.03 microns) | 5 |
| silicone oil (as in Example 1) | 3 |
| dispersant GAFAC RE-610 | 3 |
| (ex Toho Chemical Industry Co.) | |
| MEK | 150 |
| cyclohexanone | 150 |

As in Example 1, the ingredients were dispersion-mixed in a sand mill to prepare a magnetic paint, which was then coated in a 2 micron dry thickness on a film as used in Example 1. From the coated film a magnetic recording tape was prepared.

COMPARATIVE EXAMPLE 1

The procedure as described in Example 1 was repeated except that an unfluorinated carbon black from which the fluorinated graphite of Example 1 had been prepared was employed in place of the fluorinated graphite.

COMPARATIVE EXAMPLE 2

The procedure as described in Example 2 was repeated except that an unfluorinated carbon black from which the fluorinated graphite had been prepared was used in place of the fluorinated graphite in the composition of Example 2.

COMPARATIVE EXAMPLE 3

The procedure as described in Example 1 was repeated except that the fluorinated graphite was omitted from the paint composition and the proportion of silicone oil was doubled.

The recording tapes from the above Examples were subjected to performance tests. The results are summerized in the table below.

|  | Br/Bm | Friction coefficient | Video Characteristics | | | Surface properties* |
|---|---|---|---|---|---|---|
|  |  |  | Sensitivity (dB) at 3 MHz | S/N (dB) | Still properties (minutes) | |
| Ex. 1 | 0.83 | 0.33 | +1.6 | +3.2 | >60 | smooth |
| Comp. Ex. 1 | 0.82 | 0.39 | 0 | 0 | 30 | slightly rough |
| Comp. Ex. 2 | 0.83 | 0.37 | +0.7 | +1.1 | 5 | smooth |
| Ex. 2 | 0.80 | 0.31 | +1.3 | +2.4 | >60 | smooth |
| Comp. Ex. 3 | 0.77 | 0.46 | 0 | 0 | 15 | slightly rough |

*evaluated through microscopic examination.

By comparing the performances shown in the table, it is evident that the carbon black used conventionally as an antistatic agent (as in Comparative Examples 1 and 2) does not give rise to the advantages obtained by addition of the fluorinated graphite according to the present invention. That is the addition of fluorinated graphite instead of carbon black to the magnetic paint composition reduces the friction coefficient of the magnetic layer formed from the composition and improves the electromagnetic performance properties of the media (Examples 1 and 2)

What is claimed is:

1. A magnetic recording medium consisting of a magnetic layer comprising particles of a magnetic powder material embedded in a matrix of a binder and a substrate carrying said magnetic layer, said magnetic layer further comprising a lubricant comprising a mixture of silicone oil and an amount of fluorinated graphite material effective to significantly enhance the lubricating effect of said lubricant.

2. A magnetic recording medium as claimed in claim 1 wherein said fluorinated graphite material is represented by the formula:

$$(CF_x)_n$$

wherein $\underline{x}$ is a value greater than 0.1 but less than unity.

3. A magnetic recording medium as claimed in claim 1 wherein said fluorinated graphite material has an average primary particle size ranging from about 0.01 to about 0.1 microns.

4. A magnetic recording medium as claimed in claim 1 wherein said fluorinated graphite material is present in a proportion of about 2-15 parts by weight per 100 parts by weight of said magnetic powder material.

5. A magnetic recording medium as claimed in claim 1 wherein said silicone oil is present in a proportion of about 0.1-10 parts by weight per 100 parts by weight of said magnetic powder material.

6. A process for producing a magnetic recording medium having a magnetic layer as claimed in claim 1 comprising the steps of:
   providing a magnetic paint composition comprising a magnetic powder material, a lubricant comprising a mixture of a silicone oil and an amount of a fluorinated graphite material effective to significantly enhance the lubricating effect of said lubricant;
   applying said paint composition to a substrate;
   drying said coated substrate to form said magnetic layer; and then
   calendering and aging said dried substrate to condition the thus formed magnetic layer thereon.

7. A process as claimed in claim 6 comprising a further step of slitting the conditioned product into a strip or ribbon of magnetic recording medium.

8. A process as claimed in claim 6, wherein said fluorinated graphite material is represented by the formula:

$$(CF_x)_n$$

wherein $\underline{x}$ is a value greater than 0.1 but less than unity.

9. A process as claimed in claim 6, wherein said fluorinated graphite material has an average primary particle size ranging from about 0.01 to about 0.1 microns.

10. A process as claimed in claim 6, wherein said fluorinated graphite material and silicone oil are present in proportions of about 2-15 parts and about 0.1-10 parts by weight, respectively, per 100 parts by weight of said magnetic powder material.

* * * * *